US009471566B1

(12) United States Patent
Zhang et al.

(10) Patent No.: US 9,471,566 B1
(45) Date of Patent: Oct. 18, 2016

(54) METHOD AND APPARATUS FOR CONVERTING PHONETIC LANGUAGE INPUT TO WRITTEN LANGUAGE OUTPUT

(75) Inventors: Lei Zhang, Beijing (CN); Shuguang Yan, Beijing (CN)

(73) Assignee: Oracle America, Inc., Redwood City, CA (US)

( * ) Notice: Subject to any disclaimer, the term of this patent is extended or adjusted under 35 U.S.C. 154(b) by 2573 days.

(21) Appl. No.: 11/105,760

(22) Filed: Apr. 14, 2005

(51) Int. Cl.
*G06F 17/20* (2006.01)
*G06F 17/28* (2006.01)
*G06F 17/22* (2006.01)

(52) U.S. Cl.
CPC ....... *G06F 17/2863* (2013.01); *G06F 17/2223* (2013.01)

(58) Field of Classification Search
CPC ............... G06F 17/2223; G06F 17/28; G06F 17/2809; G06F 17/2863; G06F 17/2872; G06F 17/2881; G06F 17/289
USPC ........ 704/2–5, 7–9, 277; 715/536, 535, 256, 715/262, 264
See application file for complete search history.

(56) References Cited

U.S. PATENT DOCUMENTS

| | | | | |
|---|---|---|---|---|
| 5,270,927 A | * | 12/1993 | Sproat | 715/535 |
| 5,832,478 A | * | 11/1998 | George | 707/3 |
| 5,835,924 A | * | 11/1998 | Maruyama et al. | 715/535 |
| 6,073,146 A | * | 6/2000 | Chen | 715/535 |
| 6,154,758 A | * | 11/2000 | Chiang | 715/263 |
| 6,256,630 B1 | * | 7/2001 | Gilai et al. | 707/6 |
| 6,356,866 B1 | * | 3/2002 | Pratley et al. | 704/9 |
| 6,374,210 B1 | * | 4/2002 | Chu | 704/9 |
| 6,460,015 B1 | * | 10/2002 | Hetherington et al. | 704/8 |
| 6,782,357 B1 | * | 8/2004 | Goodman et al. | 704/9 |
| 6,822,585 B1 | * | 11/2004 | Ni et al. | 341/28 |
| 7,013,258 B1 | * | 3/2006 | Su et al. | 704/1 |
| 7,107,204 B1 | * | 9/2006 | Liu et al. | 704/2 |
| 7,165,019 B1 | * | 1/2007 | Lee et al. | 704/2 |
| 7,224,346 B2 | * | 5/2007 | Sheng | 345/171 |
| 7,249,013 B2 | * | 7/2007 | Al-Onaizan et al. | 704/9 |

(Continued)

OTHER PUBLICATIONS

Russ Rolfe, "What is an IME (Input Method Editor) and how do I use it?," Microsoft, Jul. 15, 2003, 22 pages.

(Continued)

*Primary Examiner* — Paras D Shah
(74) *Attorney, Agent, or Firm* — Robert C. Kowert; Meyertons, Hood, Kivlin, Kowert & Goetzel, P.C.

(57) ABSTRACT

Method and apparatus for converting language text input into a different language text output. One embodiment may be configured to convert Pinyin into written Chinese language text. Embodiments may provide a language input mechanism that accepts phonetic language input text and generates written language output text, and that also accepts modifications to existing input text and automatically corrects the corresponding output text. Embodiments may display one or more alternative output text words and/or sentences as candidates for the transliteration of the input text. The candidate output words may be ranked according to calculated probabilities, with a most probable candidate appearing first. The user may select from the candidate output text to build an output sentence that represents the correct or preferred transliteration of the input text. A lexicon, language model and history cache of previously selected output text words may be referenced in determining the probabilities of candidate output words.

51 Claims, 11 Drawing Sheets

(56) References Cited

U.S. PATENT DOCUMENTS

| | | | |
|---|---|---|---|
| 7,277,732 B2* | 10/2007 | Chen et al. | 455/566 |
| 7,376,648 B2* | 5/2008 | Johnson | 707/4 |
| 7,403,888 B1* | 7/2008 | Wang et al. | 704/2 |
| 7,581,180 B2* | 8/2009 | Masui et al. | 715/259 |
| 7,616,190 B2* | 11/2009 | Li et al. | 345/168 |
| 2003/0023420 A1* | 1/2003 | Goodman | 704/1 |
| 2003/0110451 A1* | 6/2003 | Wen et al. | 715/536 |
| 2004/0006458 A1* | 1/2004 | Fux et al. | 704/8 |
| 2005/0057512 A1* | 3/2005 | Du et al. | 345/168 |
| 2005/0209844 A1* | 9/2005 | Wu et al. | 704/2 |
| 2006/0048055 A1* | 3/2006 | Wu et al. | 715/535 |
| 2006/0129928 A1* | 6/2006 | Qiu | G06F 3/018 715/262 |
| 2006/0161520 A1* | 7/2006 | Brewer et al. | 707/3 |

OTHER PUBLICATIONS

"IME Tutorial," web article (www.andante.org), Jan. 5, 2003, 9 pages.

Microsoft Global Input Method Editors (IMEs), Microsoft, web article, published Mar. 18, 1999, 2 pages.

Katz, S., "Estimation of probabilities from sparse data for the language model component of a speech recognizer", Acoustics, Speech, and Signal Processing [see also IEEE Transaction on Signal Processing], Xplore Release 2.1, Mar. 1987.

* cited by examiner

Input text string →
Candidate output text →

Input text string → xi'an shi min ga
Candidate output text → 1. 西安市民伽  2. 西安  3. 西安市  4. 西  5. 戏  6. 系

*FIG. 9m* xi'an shi min gan
1. 西安市敏感  2. 西安市  3. 西安  4. 西  5. 戏  6. 系

*FIG. 9n* xi'an shi min gan d
1. 西安市敏感的  2. 西安市  3. 西安  4. 西  5. 戏  6. 系

*FIG. 9o* xi'an shi min gan da
1. 西安市敏感大  2. 西安市  3. 西安  4. 西  5. 戏  6. 系

*FIG. 9p* xi'an shi min gan dao
1. 西安市民感到  2. 西安  3. 西安市  4. 西  5. 戏  6. 系

*FIG. 9q*

西安shi min gan dao
1. 市民感到  2. 市民  3. 士民  4. 是  5. 时  6. 使

*FIG. 9r*

METHOD AND APPARATUS FOR CONVERTING PHONETIC LANGUAGE INPUT TO WRITTEN LANGUAGE OUTPUT

BACKGROUND OF THE INVENTION

1. Field of the Invention

This invention relates to computer systems, and more particularly to input mechanisms for converting phonetic language text, such as Pinyin, into written language text, such as Chinese language text.

2. Description of the Related Art

Pinyin, (拼音, Pinyin) means "join sounds", or "phoneticize", in Chinese, and typically refers to Hànyû Pīnyīn (汉语拼音, , or "Han language Pinyin"). Pinyin is a system for the Romanization (the phonetic notation and transliteration to written text using the roman alphabet characters a through z) for Standard Mandarin Chinese. Another form of Pinyin is Tongyong Pinyin, which is similar to Hànyû Pīnyīn with changes for certain sounds. Similar systems have been developed for Chinese dialects and minority languages. Cantonese also has a Pinyin-type system called Penkyamp, or Cantonese Pinyin.

Pinyin has been adapted as a system for entering Chinese language text into computers. Various Pinyin Input Methods (PIMs) have been developed that assist the user in converting inputted Pinyin strings into Chinese character strings. Conventional PIMs may require the user to select the intended conversion result word by word. A problem that conventional PIMs face is that there may be many Chinese character candidates for a single Pinyin syllable, as well as many word candidates for a Pinyin syllable sequence. Thus, if the PIM displays a list of determined candidate characters or words for Pinyin input, the displayed list may not order the candidates so that the candidate(s) that the user actually wants as output text is "first" on the list or at least high on the list, and thus easily selectable. In other words, the conversion precision tends to be low. This may require more effort by the user to locate and select the desired output text (word or character) for the Pinyin input text.

SUMMARY

Embodiments of a method and apparatus for converting language text input into a different language text output are described. Embodiments may, for example, be configured to convert phonetic language text input using one symbol set or alphabet to phonetically represent a spoken language into written language text output that may represent the spoken language in a symbol set or alphabet common to the written form of that spoken language. More specifically, some embodiments may be configured to convert phonetic Pinyin text input, such as HànyûPinyin, into written Chinese language text output. Pinyin is a written text that uses the twenty-six alphabetic characters of the Roman alphabet, and possibly other symbols such as punctuation and accent marks, to phonetically represent a spoken Chinese language, such as Mandarin Chinese, which is historically written using a Chinese symbol set, or alphabet.

Embodiments may provide a computer-implemented language input mechanism with a user interface that accepts phonetic language input text, such as Pinyin, and generates written language output according to a symbol set, or alphabet, such as Chinese written language output text. Embodiments of the language input mechanism may accept additions, modifications, and/or insertions to existing input text and automatically correct the corresponding displayed candidate output text in context according to the additions, insertions, and/or modifications to the input text.

Embodiments may display one or more alternative written language words and/or sentences as candidates for the most accurate (or preferred) transliteration of a portion or all of the entered phonetic language input text. In one embodiment, a candidate output sentence for the input text starting at a current selection position may be displayed, along with one or more candidate output words for the input text starting at the current selection position. A candidate output sentence may be an entire sentence or two or more words that form a portion of a sentence. The candidate output words may be ranked, and displayed, according to a probability score calculated by the language input mechanism, with a most probable candidate appearing first.

Embodiments of the language input mechanism may provide user interface elements and mechanisms through which the user may select from among the candidate output sentences and candidate output words to build a written language output text that represents the correct or preferred transliteration of the phonetic language input text. The completed output text may then be manually or automatically written, or "committed", to a destination, such as a display window of a program or application running on the computer system, a command line, or a file.

Embodiments of the language input mechanism may include a Language Model which may be accessed in determining the probability scores for candidate output strings and selecting a best or preferred full phrase or sentence candidate as output text based at least partially on the input text context. Embodiments may also include a Lexicon that may be used to map "syllables" of the phonetic language input string to one or more candidate words in the written language "alphabet" or symbol set. The Lexicon may be configured so as to aid the language input mechanism in distinguishing possible variations in pronunciation of syllables of the phonetic language input text, and/or for recognizing the entry of "partial syllables" by the user in the input text. Embodiments may also maintain a History Cache of output text committed by the user that may be used in determining the probability scores of the output text candidates of a current input text. The History Cache may enable the language input mechanism to "learn" preferences of the user in the translation of particular syllables of the input text and in the usage of combinations of two or more syllables from previously committed output text.

The Language Model, Lexicon, and History Cache are part of an overall architecture that may allow embodiments of the language input mechanism to achieve high conversion precision, and to thus reduce or minimize the number of user interactions that may be necessary to select from among candidate output sentences and output words and/or to correct erroneous output text.

Figure 1:
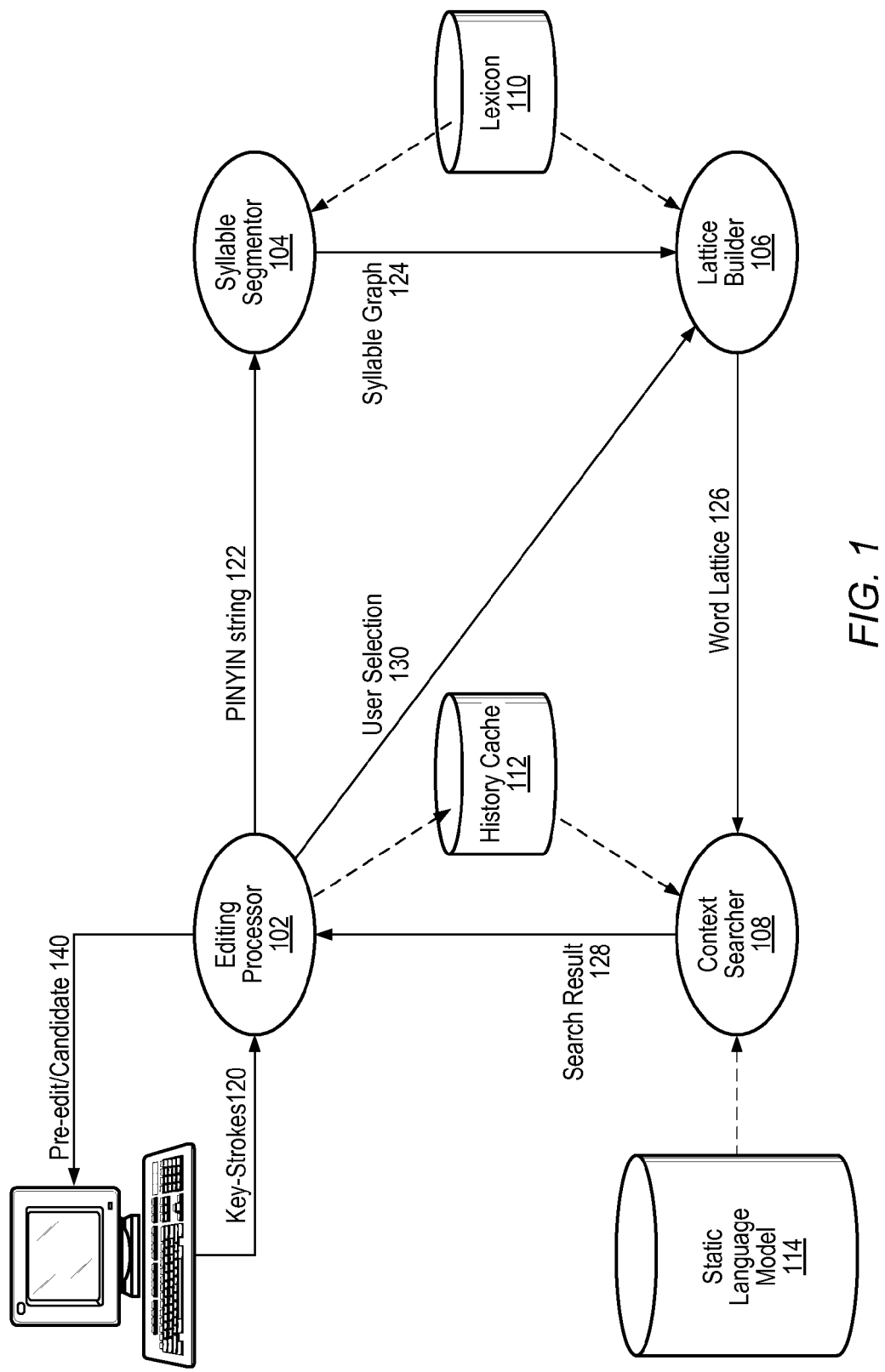
FIG. 1 illustrates an exemplary architecture for the language input mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for converting language text input into a different language text output are described. Embodiments may, for example, be configured to convert phonetic language text input using one symbol set or alphabet to phonetically represent a spoken language into written language text output that may represent the spoken language in a symbol set or alphabet common to the written form of that spoken language. More specifically, some embodiments may be configured to convert phonetic Pinyin text input, such as HànyûPinyin, into written Chinese language text output. Pinyin is a written text that uses the twenty-six alphabetic characters of the Roman alphabet, and possibly other symbols such as punctuation and accent marks, to phonetically represent a spoken Chinese language, such as Mandarin Chinese, which is historically written using a Chinese symbol set, or alphabet.

Embodiments may provide a computer-implemented language input mechanism that accepts phonetic language text input (which may be referred to herein as simply "input", or "input text"), such as Pinyin (for example, HànyûPinyin) text input, and generates written language text output according to a symbol set, or alphabet, such as Chinese written language text output (which may be referred to herein as simply "output", or "output text"). Embodiments of the language input mechanism may accept additions, modifications, and/or insertions to existing input text and automatically (without requiring further intervention from the human operator) correct the corresponding displayed candidate output text in context according to the additions, insertions, and/or modifications to the input text. An exemplary user interface for the language input mechanism is further described below.

Embodiments may display one or more alternative written language words and/or sentences as candidates for the most accurate (or preferred) transliteration of a portion or all of the entered phonetic language input text. In one embodiment, a candidate output sentence for the input text starting at a current selection position may be displayed, along with one or more candidate output words for the input text starting at the current selection position. A candidate output sentence may be an entire sentence or two or more words that form a portion of a sentence. The candidate output words may be ranked, and displayed, according to a probability score calculated by the language input mechanism, with a most probable candidate appearing first. In embodiments, the context of the input text and a history cache of prior selections of output text maintained by the language input mechanism may be referenced in determining the probability scores of candidate output words. Embodiments of a mechanism by which the probability scores and ranking of candidate output words and output sentences may be determined are described below.

Embodiments of the language input mechanism may provide user interface elements and mechanisms through which the user may select from among the candidate output sentences and candidate output words to build a written language output text that represents the correct or preferred transliteration of the phonetic language input text. The completed output text may then be manually or automatically written, or "committed", to a destination, such as a display window of a program or application running on the computer system, a command line, or a file.

Figure 11:
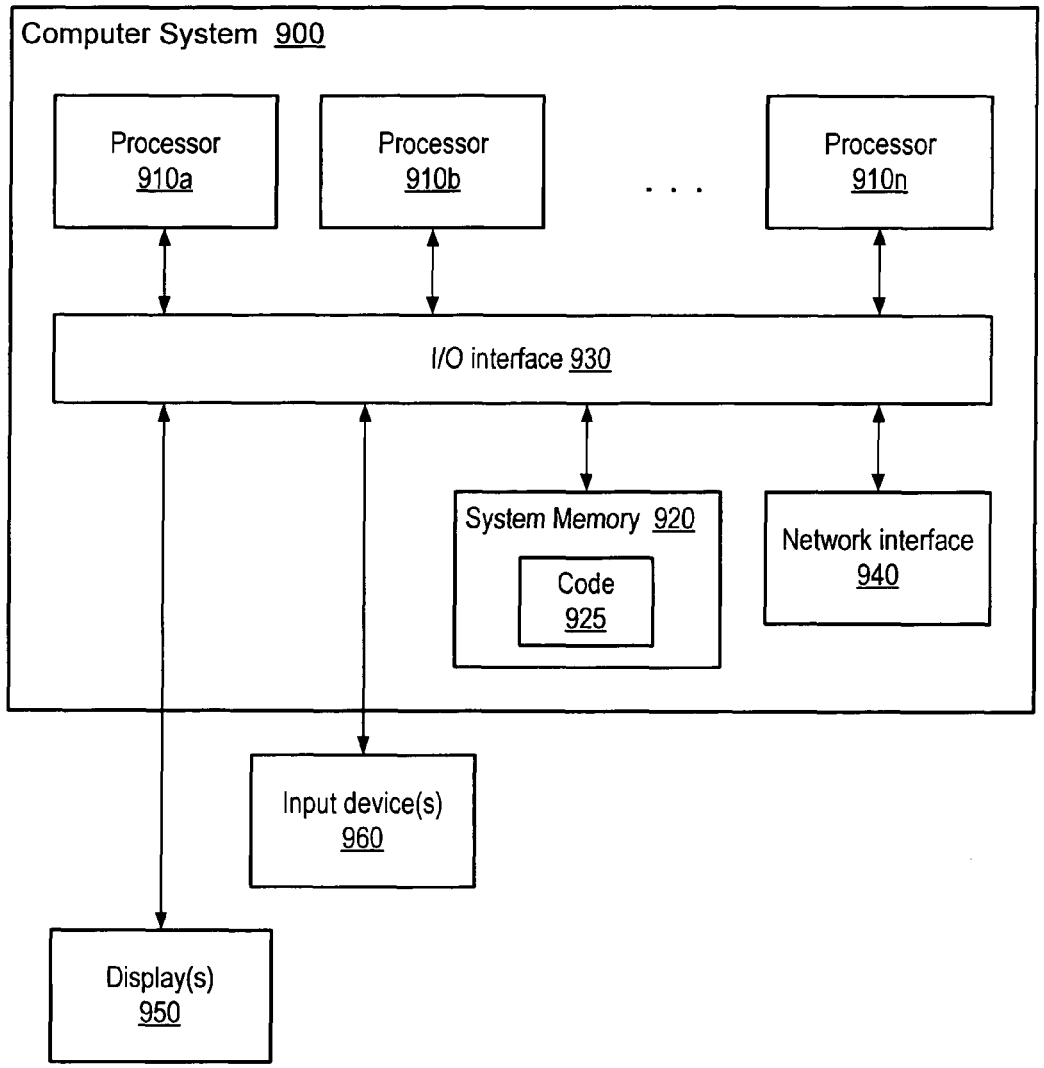
FIG. 11 illustrates an exemplary system on which embodiments of the language input mechanism may be implemented.

Embodiments of the language input mechanism may be implemented on any of a variety of computer systems including one or more of, but not limited to, workstations, server computers, personal computer systems, desktop computers, laptop or notebook computers, mainframe computer systems, workstations, network computers, handheld devices such as PDAs, or any digital device with processing and memory capabilities suitable for hosting an embodiment of the language input mechanism. FIG. 11 illustrates an exemplary system on which embodiments of the language input mechanism as described herein may be implemented. Various embodiments may be implemented as applications, utilities or components of software programs locally on a computer system, and/or as applications, utilities, or program components that may be accessed over a wired or wireless network such as a LAN, WAN, or Internet, by other applications, utilities or services in client-server or peer-to-peer networking environments. Some embodiments may be implemented as Web site-hosted applications, utilities or services accessed through a Web browser or some other application.

While embodiments are generally described herein as a language input mechanism configured to convert phonetic Pinyin text input, specifically HànyûPinyin, into written Chinese language text output, note that embodiments of the language input mechanism may be implemented that are configured to convert various types of symbolic input into one or more different types of symbolic output. In general, various embodiments may be configured to convert any of a variety of phonetic language text input that uses one symbol set or alphabet (such as the Roman alphabet) to phonetically represent a spoken language into written language text output that represents the spoken language in a symbol set or alphabet common to the written form of that spoken language. For example, an embodiment may be configured to convert Tongyong Pinyin input into a Chinese language text output. As another example, an embodiment may be configured to convert Penkyamp (or Cantonese) Pinyin into a Cantonese language text output. Other Embodiments are anticipated that may accept phonetic language text input of other spoken languages including, but not limited to, Japanese Korean, Arabic, and other languages and dialects, and convert the input into a written language text output that represents the respective spoken language in a symbol set or alphabet common to the written form of that respective spoken language. In addition, various embodiments may be configured to convert written language text input that represents a spoken language in a symbol set or alphabet common to the written form of that spoken language into a phonetic language text output that uses another symbol set or alphabet (such as the Roman alphabet) to phonetically represent the spoken language.

Various embodiments of the language input mechanism may be implemented as stand-alone applications or utilities, or as components of various types of software programs including, but not limited to, applications, services, and utilities. Various embodiments may be implemented as features, modules or components of, or plug-ins for, various types of applications including one or more of, but not limited to: text editors, word processors, email programs, graphical programs that accept text input, spreadsheet applications, Web site or Web browser software that accepts text input, programming editors, games, and in parts of operating systems that accept text input from users or administrators. In general, embodiments may be implemented in or added to any type of software program, application, utility, etc. that may have some purpose for converting language text input into a different language text output.

Language Input Mechanism Architecture

Embodiments of the language input mechanism may include a Language Model, such as a Chinese Language Model, trained from a large corpus of language material, which may be accessed in determining the probability scores for candidate output strings and selecting a best or preferred full phrase or sentence candidate as output text based at least partially on the input text context. Embodiments may also include a Lexicon that may be used to map "syllables" of the phonetic language input string to one or more candidate words in the written language "alphabet" or symbol set. The Lexicon may be configured so as to aid the language input mechanism in distinguishing possible variations in pronunciation of syllables of the phonetic language input text, and/or for recognizing the entry of "partial syllables" by the user in the input text, as further described below. Embodiments may also maintain a History Cache of output text committed by the user that may be used in determining the probability scores of the output text candidates of a current input text. The History Cache may enable the language input mechanism to "learn" preferences of the user in the translation of particular syllables of the input text and in the usage of combinations of two or more syllables from previously committed output text.

The Language Model, Lexicon, and History Cache are part of an overall architecture that may allow embodiments of the language input mechanism to achieve high conversion precision, and to thus reduce or minimize the number of user interactions that may be necessary to select from among candidate output sentences and output words and/or to correct erroneous output text.

FIG. 1 illustrates an exemplary architecture for the language input mechanism according to one embodiment. System 100 represents a device on which a user interface to the language input mechanism may be displayed and through which the user may enter phonetic language input text and interact with the language input mechanism to construct written language output text. An exemplary user interface for the language input mechanism is described below. System 100 may be any of a variety of devices including one or more of, but not limited to, workstations, server computers, personal computer systems, desktop computers, laptop or notebook computers, mainframe computer systems, workstations, network computers, handheld devices such as PDAs, or any digital device with processing and memory capabilities suitable for hosting an embodiment of the language input mechanism. FIG. 11 illustrates an exemplary system on which embodiments of the language input mechanism as described herein may be implemented.

In FIG. 1, the ellipses (Editing Processor 102, Syllable Segmenter 104, Lattice Builder 106, and Context Searcher 108) represent modules or processes of the language input mechanism that execute to process data represented by the solid lines; arrows at the end of the solid lines indicating the data processing flow direction. The cylinders (Lexicon 110, History Cache 112, and Statistical Language Model 114) represent knowledge databases that may be accessed during the processing of the data. The dashed lines with arrows pointing from the knowledge databases to the modules or processes indicate references to the knowledge databases. The dashed lines with arrows pointing to the knowledge databases indicate updates to the knowledge databases.

Editing Processor 102 may receive keystrokes 120 from the user interface as input text and send the candidate output text 140 to the user interface. Functions of Editing Processor 102 may include, but are not limited to:

Determining if keystrokes 120 are input text editing commands.

From keystrokes 120, building or modifying an input text string 122 (e.g., a Pinyin string such as mingan), and sending the input text string 122 to Syllable Segmenter 104.

Displaying Search Results 128 to the user interface on system 100. In one embodiment, one or more candidate output text words and/or sentences may be extracted from Search Results 128 by Editing Processor 102 to be displayed as candidate output text 140.

Updating History Cache 112 with the selected input text-to-output text conversion result (e.g., a Pinyin-to-Chinese character conversion result) committed by the user.

Notifying Lattice Builder 106 when the user makes a selection 130 from the candidate output text words and/or sentences.

Lexicon 110 is a knowledge database that may be used in determining if an input prefix string is a valid syllable prefix, and in mapping valid syllable sequences into one or more output text words. Note that a syllable may represent the pronunciation in the phonetic language of one character in the written language. In Pinyin, for example, a syllable is the representation of the phonetic pronunciation of one Chinese character in the Roman alphabet. As an example, the Pinyin syllable ta typically represents the Chinese character 她. Note, however, that there may be more than one pronunciation for a Chinese character. For example, an alternative, but rare, pronunciation for 她 is chi.

Embodiments of the language input mechanism may accept the entry of partial syllables in the input text by the user. The Lexicon 110 may provide two or more phonetic language full syllable (word) candidates for an entered partial syllable or syllables. For example, if the user enters the partial syllables m'g, the Lexicon 110 may provide the set [ming'an, min'gan, mei'guo, min'gong, . . . ] as full syllable (word) candidates. Note that, in m'g and in the full syllable candidates, ['] represents a syllable boundary. In one embodiment, partial syllables and/or sequences of two or more partial syllables (e.g., m'g) may be recorded in Lexicon 110 as are normal full syllables or full syllable sequences. Embodiments of the language input mechanism may generate partial syllable strings and their corresponding word sets automatically from all full syllable strings for all words recorded in Lexicon 110. The inclusion of partial syllables in Lexicon 110 and the ability to map the partial syllables to their corresponding word sets allows the language input mechanism to automatically handle the entry of partial syllables by the user without having to build word sets for partial syllables from scratch at run time.

In one embodiment, Lexicon 110 may be implemented according to a Key Tree data structure. Other embodiments may use other data structures for the Lexicon 110.

Syllable Segmenter 104 may use valid syllable prefix information from Lexicon 110 to generate a Syllable Graph 124 from Input Text String 122. As described above, there may be various syllable segmentations for Input Text String 122. In one embodiment, a "longest first" algorithm may be used to do the basic segmentation and to put the results of the segmentation into Syllable Graph 124. For example, for the input text string mingan, ming'an may be the result of the "longest first" algorithm. Note, however, that symbol segmentation may be ambiguous; in other words, the user may intend some other syllable segmentation for an Input Text String 122. For example, when the user inputs mingan, they may intend the syllable segmentation to be min'gan and not ming'an. In one embodiment, a collection of such ambiguous input text strings may be saved in Syllable Segmenter 104, and when an ambiguous input text string is encountered, alternative segmentations may be added to the Syllable Graph 124. The Syllable Segmenter 104 also handles arbitrary syllable breaks entered by the user in the Input Text String 122. For example, in one embodiment, the user may insert ['] into an input text string, e.g. as in min'gan. In this case, the Syllable Segmenter 104 may use the user-specified syllable breaks in building the Syllable Graph 124.

Syllable Graph 124 represents a set of possible and reasonable syllable segmentations for a given Input Text String 122 as determined by the Syllable Segmenter 104 using Lexicon 110. For example, one syllable segmentation for the Pinyin String mingan is min'gan; ming'an is also a valid full-syllable segmentation. If partial syllables are considered, mi'n'gan, mi'n'g'a'n, . . . , etc are also valid segmentations. In one embodiment of the language input mechanism, the user may be allowed to enter English words along with Pinyin, and the Language input mechanism recognizes the English words and does no transliterate them into Chinese characters. If Pinyin and English are allowed in Input Text String 122, m'i'n'g'a'n is also a valid segmentation of mingan, where i could be treated as an English word or character. In one embodiment, Syllable Graph 124 may not enumerate all possible whole segmentation results, but instead may record every possible syllables in part, since the segmentation results are combinations of the syllables in part. A similar structure may also be used in Word Lattice 126, which is constructed by Lattice Builder 106 as described below.

Figure 2:
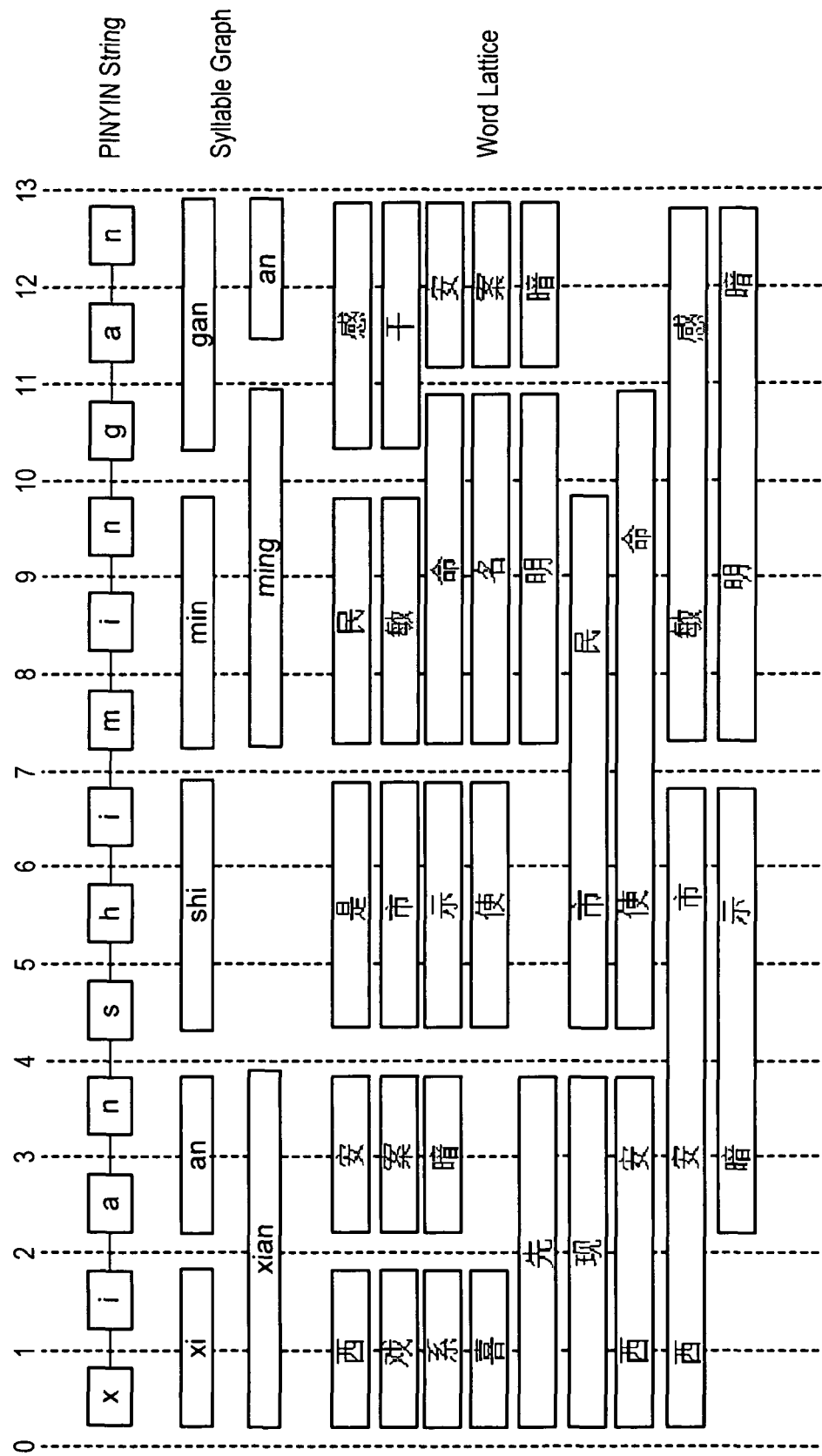
FIG. 2 illustrates the relationship between an exemplary Input Text String, an exemplary Syllable Graph, and an exemplary Word Lattice according to one embodiment.

FIG. 2 illustrates the relationship between an exemplary Input Text String 122 and an exemplary Syllable Graph 124 (generated by Syllable Segmenter 104) and Word Lattice 126 (constructed by Lattice Builder 106) for the exemplary Text Input String 122, according to one embodiment. In this example, the Input Text String 122 is the Pinyin string xianshimingan. Exemplary Syllable Graph 124 represents a set of possible and reasonable syllable segmentations for the exemplary Input Text String 122 xianshimingan as determined by the Syllable Segmenter 104 using Lexicon 110. Exemplary Word Lattice 126 represents a set of candidate output text word sets (which may be referred to as sentences) as represented by Chinese characters (each rectangle represents a word) as determined by Lattice Builder 106.

To summarize this part of the process, Syllable Segmenter 104 generates a set of possible and reasonable syllable segmentations (Syllable Graph 124) for the exemplary Input Text String 122. Lattice Builder 106 then generates a set of candidate output text word sets (Word Lattice 126) from the Syllable Graph 124.

Word Lattice 126 is a data structure that is used to record candidate output text words sets for possible ranges of syllables in the Input Text String 122. In one embodiment, Word Lattice 126 may include every possible sentence constructed from the candidate words in Syllable Graph 124. Lattice Builder 106 may find every valid syllable subsequence from Syllable Graph 124 that maps to a candidate word set (sentence), and puts them into Word Lattice 126. Note, however, that in one embodiment, some words may be pruned from the candidate words to control the size of the Word Lattice 126, as described below.

The number of candidate words in the Word Lattice 126 may negatively affect the speed of conversion from input text to candidate output text. In some embodiments, to improve performance, pruning of the Word Lattice 126 may be performed by selectively dropping some candidate words. In one embodiment, words in the candidate word set in Lexicon 110 may be ranked or sorted by their frequency or unigram probability in a corpus of training text, such as that used to build the Statistical Language Model 114. In one embodiment, the Statistical Language Model 114 may be trained and then used to determine the unigram probabilities of the words in the Lexicon 110. When a set of candidate words for an Input Text String 122 is determined from Lexicon 110 that may be placed into Word Lattice 126, a constant window size is applied to control how many of the candidate words in the set are actually placed in the Word Lattice 126. If there are more candidate words in the set than the window size allows, one or more of the candidate words with lower unigram probabilities in the training text may be pruned.

In one embodiment, candidate words that appear in the History Cache 112, and were thus previously selected by the user, may be placed into the Word Lattice 126 regardless of their unigram probability in the training text. In other words, the presence of a candidate word in the History Cache 112 may prevent the candidate word from being pruned from the Word Lattice 126. In one embodiment, this may result in another low-probability candidate word being pruned from the Word Lattice 126 to satisfy the window size limit. In another embodiment, the window size may be expanded to accommodate words that appear in the History Cache. The operation of the History Cache 112 is further described below.

In one embodiment, Statistical Language Model 114 is a knowledge database or structure that represents the back-off n-gram language model. Statistical Language Model 114 may be trained in advance from a (potentially large) collection of text. In Pinyin-to-Chinese character conversion, Statistical Language Model 114 may be used to determine the probability $P(W_i|W_{i-2}W_{i-1})$. More precisely, Statistical Language Model 114 may be used by the language input mechanism to perform the following task. For a given state S of the Statistical Language Model, and a given word $W_i$, find $P(W_i|S)$, and determine the resulting Statistical Language Model state t after the transition from S on $W_i$, where S is the history words string ($W_{i-2}$, $W_{i-1}$). This abstraction leverages the programming differences caused by using different level n-gram models, such as 1-gram, 2-gram, 3-gram, etc. One embodiment may use 3-gram as there are two (3-1) history words.

There are many multi-pronounced words in the Chinese language, for example, 行 could be pronounced as zing or hang (both valid Pinyin syllables). Some such pronunciations are more common than others are. For example, 她. is pronounced ta in most cases, but chi is a relatively rare pronunciation. Considering this the other way around, there may be two or more Chinese words that match a given Pinyin syllable or syllables. When listing candidate output words for an input Pinyin syllable or syllables, the output word(s) that are more commonly associated with the Pinyin syllable(s) should be listed first, before words that correspond to relatively rare pronunciations as represented in Pinyin. It would be incorrect, for example, to have 她. listed at the beginning of the candidate output words for the Pinyin syllable chi. Without considering and dealing with the problem of multi-pronounced words, a language model-based search may result in output text words representing less common transliterations of Pinyin syllable(s) being given higher probability than and therefore listed before output text words representing more common transliterations.

In one embodiment of the language input mechanism, to overcome the multi-pronunciation problem described above, for each word with multiple pronunciations, each word/pronunciation combination may be treated as a separate word. In other words, each unique 2-tuple (word, pronunciation) may be treated as a separate word, and each of these separate words may be given a unique identifier, or word ID. In one embodiment, to do this, during Language Model training, each occurrence of a word in the training text is assigned a particular pronunciation. Probabilities for all of the unique word/pronunciation 2-tuples within the training text may then be calculated.

However, assigning a particular pronunciation to each occurrence of a multi-pronounced word in a large training text may be a difficult and time-consuming task. Therefore, other embodiments may use other mechanisms to overcome the multi-pronunciation problem. The following is an example of a mechanism for dealing with the multi-pronunciation problem in one embodiment of the language input mechanism.

In this embodiment, all multiple-pronunciation words and their pronunciations are determined. Each different pronunciation of a word is assigned one of three pronunciation types, for example one of the following types: (1) major (2) normal (3) ignored. Note that the names of the types are exemplary; the types may be given other names, and the numbering of the types is a convention; the "major" type could be (3), and the "ignored" type could be (1), without affecting the operation of this mechanism. Also note that different embodiments may use two pronunciation types or more than three pronunciation types. In one embodiment, only one of the different pronunciations of a single word may be assigned the type "major". The "major" type or its equivalent represents the most common or probable pronunciation among different pronunciations of a single word. The "normal" type or its equivalent represents relatively common but not the most common pronunciations among different pronunciation(s) of a single word. The "ignored" type or its equivalent represents relatively rare or unusual pronunciation(s) among different pronunciations of a single word.

In one embodiment, a unique word identifier, or word ID, is given to each (word, pronunciation) 2-tuple and its pronunciation type is recorded (major, normal, or ignored). As noted, only one (word, pronunciation) 2-tuple for a particular word is assigned the pronunciation type "major". Note that, in one embodiment, assignment of pronunciation types may only be performed for words with multiple pronunciations. In another embodiment, all words may be assigned a pronunciation type, whether the words have multiple pronunciations or not. In this embodiment, words with only one pronunciation, that word/pronunciation may always be assigned the type "major" or its equivalent.

During training, a multi-pronunciation word is identified by the associated word ID (and the corresponding (word, pronunciation) 2-tuple) indicated as the "major" pronunciation type. In addition, an equality map is generated along with the Statistical Language Model 114 that maps each normal-typed word ID to its corresponding major-typed word ID. Thus, all "normal" pronunciations of a word, if any, may be associated with the "major" pronunciation of the word through the equality map.

For every Statistical Language Model 114 query with a parameter word w, the word's major-typed word ID (and the corresponding (word, pronunciation) 2-tuple) is used in the Language Model function. The equality map may be used to locate the "normal" pronunciations of the parameter word w, if necessary or desired.

Using this mechanism, when a (word, pronunciation) 2-tuple such as (她., chi) is marked as "ignored", it is as if the word ID and its associated (word, pronunciation) 2-tuple never appear in the training text. In a language model search, the word ID marked as "ignored" would get a relatively low context score, and thus would be listed at somewhere near the end of the candidate word set, if at all. When (word, pronunciation) 2-tuples of a word are marked as "major" and "normal", such as the 2-tuples (行,, xing) and (行,, hang), no matter what the input Pinyin is (xing or hang, in this example), their corresponding word IDs would get a relatively high context score, and thus be included at or somewhere near the head of the candidate word set.

History Cache 112 records recent user-committed sentences, which are provided by Editing Processor 102, into an internal representation. Note that, to add newly committed sentences, one or more older user-committed sentences may be purged if the History Cache 112 is full or nearly full. In one embodiment, the internal representation of the History Cache 112 may be similar to a 2-gram language model. History Cache 112 may be used to determine whether a particular word has been recently encountered. In one embodiment, commonly used words such as stops words (e.g., 的) may always be ignored; i.e. some commonly used words may be always treated as unseen recently, even though the words may have appeared in committed sentences. History Cache 112 may also be used to determine the probability of a word $W_i$ appearing right after another word $W_i$-1, i.e. the probability $P(W_i|W_i$-1). In one embodiment, this probability may be a combination of MLE (Maximum Likelihood Estimation) bigram probability, MLE unigram probability and decaying unigram probability.

Figure 3:
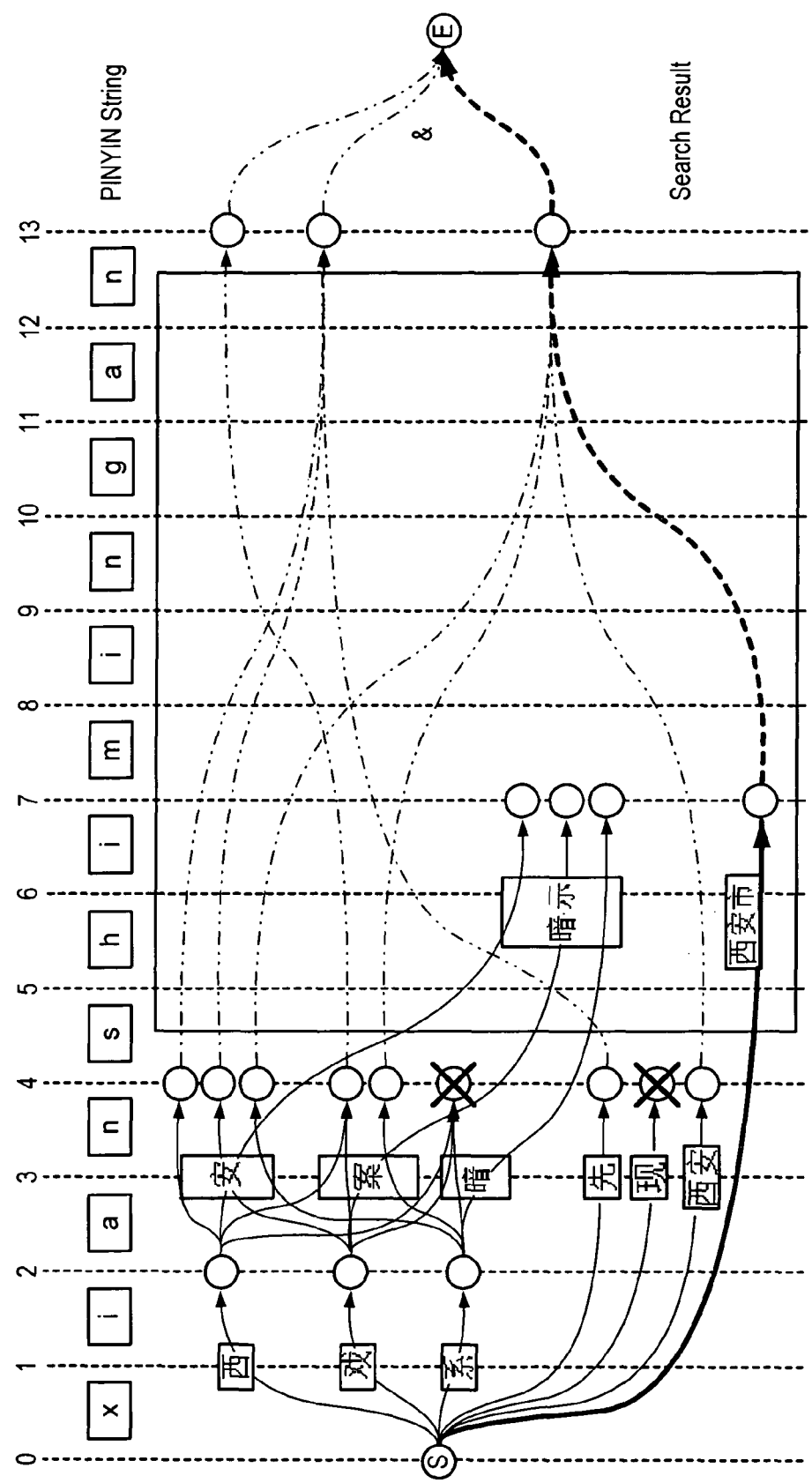
FIG. 3 illustrates a Search Results generated for an exemplary Pinyin input string according to one embodiment.

FIG. 3 illustrates an exemplary Search Results 128 as generated by Context Searcher 108 for the exemplary Pinyin input string 122 "xianshimingan", according to one embodiment. To summarize the process of generating Search Results 128, Syllable Segmenter 104 generates a set of possible and reasonable syllable segmentations (Syllable Graph 124) for the exemplary Input Text String 122, referencing the Lexicon 110. Lattice Builder 106 generates a set of candidate output text word sets (Word Lattice 126) from the Syllable Graph 124, referencing the Lexicon 110 and the History Cache 112. Context Searcher 108 then performs a "context search" that generates Search Results 128 from Word Lattice 126 generated by Lattice Builder 106, referencing the Statistical Language Model 114 and possibly the History Cache 112.

Search Results 128 may include information about the best candidate output sentence, and may indicate how well a word in the Word Lattice 126 fits in the context. Search Results 128 may be a relative complex structure. Note that FIG. 3 illustrates a conceptual view of Search Results 128 according to one embodiment, and is not intended to represent an actual structure, or to be limiting.

In FIG. 3, the circles represent states, and the general flow is from left to right. A state on the left may transit to another state on the right by reading a word in the Word Lattice 126. Words that cause transitions are represented as text in the rectangles, and the transitions are represented by arrowed curved lines between two states (note that the top row of rectangles represent the characters in the Pinyin input string 122, in this example "xianshimingan"). The leftmost state is a starting state (state S). The state after the rightmost index of the Pinyin String represents the ending state (state E).

In most cases, a state may be identified by the Statistical Language Model 114 state. A state may include information about the highest probability score, i.e., the highest probability from the starting state (state 5) to the current state. The transit from which a state's best probability score is achieved may also be recorded in the state. A transit may be thought of as 2-tuple (previous state, word) while the target state is known. The probability score of the starting state is 1.0.

For each position of the Pinyin String 122, there may be a set of states. The circles (states) with crosses indicate states that are pruned, for example due to a low probability score. This type of pruning may be referred to as beam pruning. In beam pruning, the maximum number of states in each index may be limited by using a constant beam width.

Each transition (represented by the arrowed lines) has its own probability score. For a transition t from Statistical Language Model state S to the resulting Statistical Language Model state R by reading word W:

$$P(R)=\text{MAX}(P(R),P(S)*P(t))$$

S and R are Statistical Language Model states. If no History Cache 112 is used, then:

$$P(t)=P_s(W|S)$$

where $P_s$ indicates the probability function of the Statistical Language Model 114.

When a History Cache 112 is used in conjunction with Statistical Language Model 114, the states in Search Results 128 should be carefully considered. The state definition may need to be consistent for the two models (the History Cache 112 and the Statistical Language Model 114). Statistical Language Model 114 may be pruned, and the training text used to train the Statistical Language Model 114 cannot be expected to cover all possible state transitions that it is possible for a user to enter, the states in the Statistical Language Model 114 will not cover all possible history states that History Cache 112 may encounter and record. It may be easy to get the last word in the history state of the Statistical Language Mode 114, but not so easy to track back further. In one embodiment, a 2-gram History Cache 112 may be used which uses only one history word. To represent the missing state in the Statistical Language Model 114 while allowing both of the language models to understand it, in one embodiment, the following mechanism may be used:

- The state in the Statistical Language Model 114 may be represented by an integer (e.g., a 32-bit integer), where some bits (e.g., the highest several bits) represent the level, 0, 1, 2, . . . , indicating the number of history words. At least a portion of the other bits represent the index in the node array of that level. For level 0, a valid index can only be 0.
- In one embodiment, History Cache 112 is a 2-bigram model, so its valid history state is a single word at most. In one embodiment, the unused space from the Statistical Language Model 114 at level 0 may be used. Since only index 0 is valid for Statistical Language Model 114 at level 0, a non-zero index may be used to represent the missing history state, where the non-zero index value is the history word's ID.
- This "pseudo-state" may be used when the transition target resulting from the Statistical Language Model is state (0, 0), but the word causing the transition was seen recently by the History Cache 112.
- When History Cache 112 is used, the probability score of a transition may be computed as:

$$P(t)=a*P_s(W|S)+(1-a)*P_c(W|S)$$

where a is a tuned weight in the range (0, 1.0), and $P_c$ indicates the probability function of History Cache 112.

The context score of a word in the Word Lattice is defined as the maximum probability score of transitions caused by that word. This score may be calculated during a context search performed by Context Searcher 108 and may be used to ranking the candidate output words. After the context search, a "best sentence" may be tracked from the last (rightmost, in FIG. 3) state (state E) backward (or leftward, in FIG. 3). In FIG. 3, bold lines are used to indicate a backtracking to find the "best sentence" for the exemplary Pinyin input 122. This "best sentence" may, for example, be displayed to the user as the candidate output sentence for the input text string 122.

As mentioned, Context Searcher 108 performs a context search for Word Lattice 126 on the language model represented by the Statistical Language Model 112 and History Cache 114 to generate the Search Results 128. As FIG. 3 reflects, the context search has a "left to right" natural flow. In one embodiment, Context Searcher 108 may be programmed according to a Dynamic Programming model which achieves O(B*C*N) complexity. where C is the average number of candidates at each index of the Word Lattice 126, B is the beam width, and N is the length of the Syllable Sequence.

Embodiments of the language input mechanism may use a candidate-ranking algorithm to rank the candidate output words in the generated candidate output text 140 presented to the user on system 100. In one embodiment, the candidate-ranking algorithm may use the following context information and mechanisms to sort all possible candidate output words starting at a specific position on the input text string 122. In one embodiment, the following items are weighted or considered by the candidate-ranking algorithm in the order listed, with the first given the highest weight or consideration in determining the ranking of candidate output words:
  1. Words that a user selects as correct or preferred.
  2. Words that appear in the "best candidate" sentence (the candidate output sentence).
  3. The length of the word (the longer the word, the better the word).
  4. Words that are listed in the Word Lattice 126.
  5. The context score of words that appear in the Word Lattice 126 (the higher the score, the better the word).
  6. For words that are found from the Syllable Graph 124, but are not in the Word Lattice 126 (e.g., due to pruning), the higher their 1-gram value, the better they are. (Note that the words may already be sorted according to 1-gram value in the Lexicon 110).

Note that other embodiments may use other context information and/or mechanisms for ranking the candidate output words, and/or may not use one or more of the above listed context information and mechanisms. Also, other embodiments may consider the items in the above list in different orders.

In one embodiment, to insure that user-selected words are included in the automatically generated "best sentence", each candidate word in the Word Lattice 126 may be given an Inner Weight; for those words that have not been selected by the user, the Inner Weight may be 1.0. For user-selected words, the inner weight may be a constant, for example, 1.0E100. In one embodiment, this constant value may be calculated by the language model parameters and the longest word length. Therefore, the formula to compute the transition probability score may be:

$$P(t)=Iw(W)*(a*P_s(W|S)+(1-a)*P_c(W|S))$$

where Iw( ) is this Inner Weight function.

In embodiments of the language input mechanism, a user may append characters to the input text string 122 through the user interface, but also may modify or insert characters elsewhere in the input text string 122. Because the search process described above may be time-consuming, when a user makes a selection, insertion or modification at any position, the language input mechanism keeps as much already-generated useful information as possible from the previous iteration, and thus may have to do minimal additional work to handle the modified input text string 122. In one embodiment, the input text string 122, Syllable Graph 124, Word Lattice 126 and Search Results 128 may all be saved as intermediate results for an input session. When a modification to input text string 122 happens, each process (Editing Processor 102, Syllable Segmenter 104, Lattice Builder 106, and Context Searcher 108) determines the longest prefix that would not be effected. Updates may only be applied to the parts after that prefix.

When the user modifies the input text via the user interface (generating keystrokes 120), Editing Processor 102 updates input text string 122, and also determines and reports the length of the unchanged input text string 122 prefix to Syllable Segmenter 104. Syllable Segmenter 104, using the new input text string 122 and the unchanged prefix length, updates the effected part of the Syllable Graph 124, and also determines the value of the unchanged prefix length of the Syllable Graph 124, which it reports to Lattice Builder 106. Typically, this value will be smaller than its upriver. Similarly, Lattice Builder 106 updates the effected part of the Word Lattice 126, and determines the value of the unchanged prefix length for the Word Lattice 126, which it reports to Context Searcher 108. Context Searcher 108 may then update the effected part of the Search Results 128, which are provided to the Editing Processor 102. Context Searcher 108 may perform a context search beginning right after the unchanged prefix to update the effected part of the Search Results 128.

Figure 4:
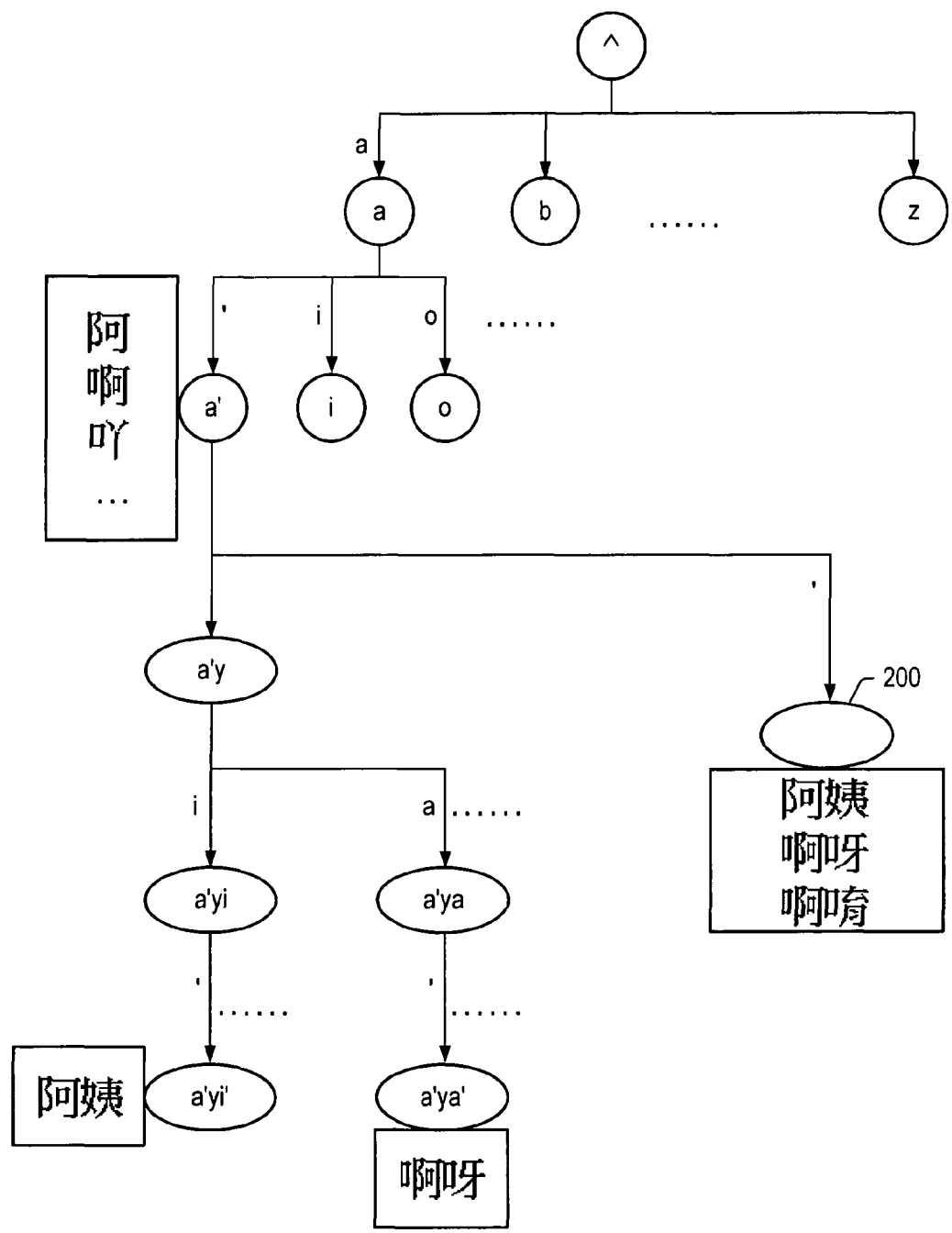
FIG. 4 illustrates an exemplary structure for a Lexicon according to one embodiment.

FIG. 4 illustrates an exemplary structure for Lexicon 110 according to one embodiment. The structure in FIG. 4 shows the following mapping of input Pinyin syllables or partial syllables to their corresponding Chinese words:

| | | | | |
|---|---|---|---|---|
| a' | 阿 | 啊 | 呀... | |
| a'yi' | 阿姨 | | | |
| a'ya' | 啊呀 | | | |
| a'y' | 阿姨 | 啊呀 | 啊呀 | (automatically generated from a "raw" Pinyin Lexicon) |

The circles and ellipses represent states; if a state maps to a set of words (indicated by boxes containing Chinese characters), then the set of words is "connected" to the state. Every state may have a set of one or more transitions (represented by the arrowed lines); the letter next to a transition line indicates the Pinyin character that causes the transition. The state marked 200 is the "partial Pinyin" state that may be automatically generated using a raw Pinyin Lexicon.

Figure 5:
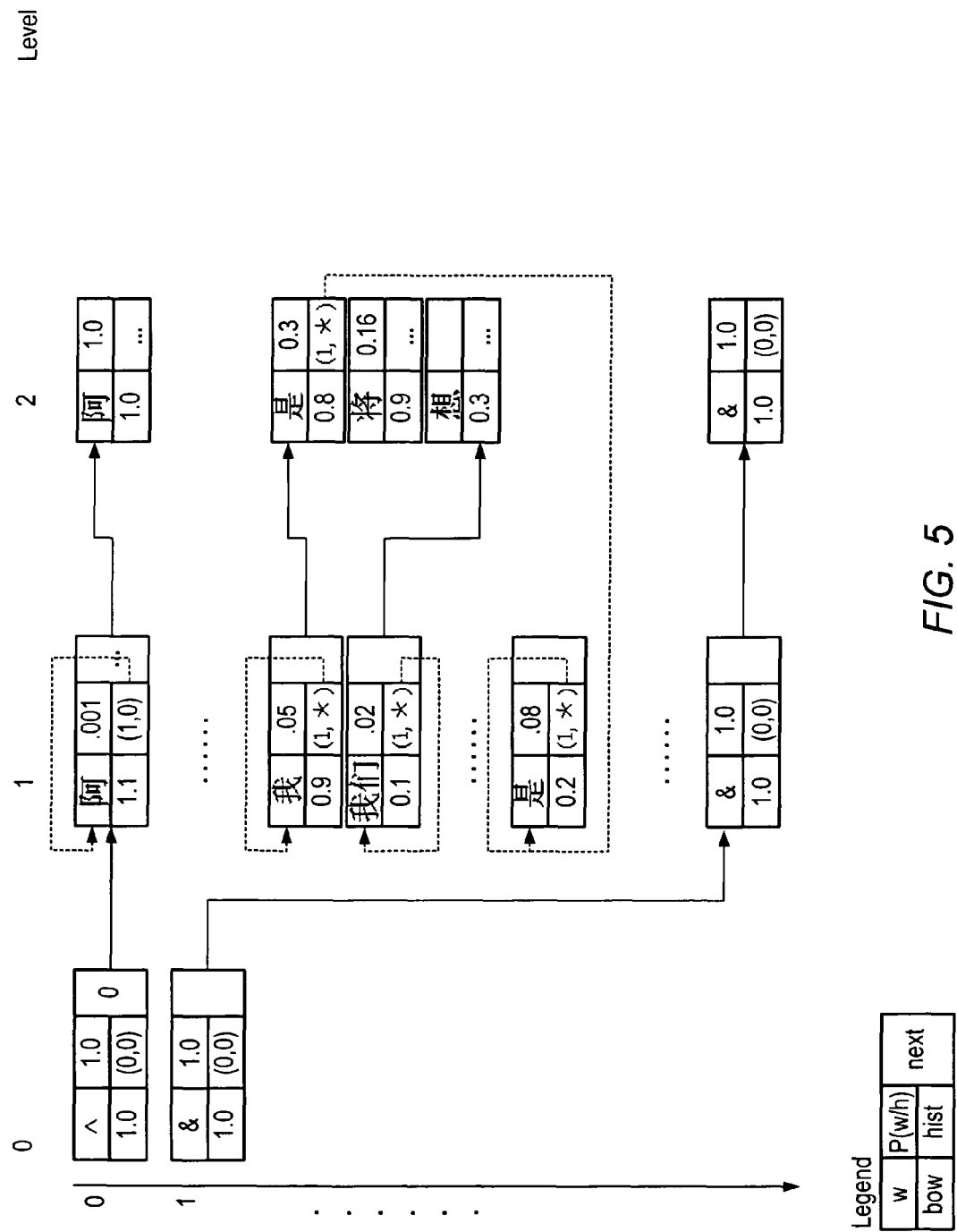
FIG. 5 illustrates an exemplary structure for a Statistical Language Model according to one embodiment.

FIG. 5 illustrates an exemplary structure for Statistical Language Model 114 according to one embodiment. The Statistical Language Model 114 may be a multilevel array. For an N-gram where N is 2, there are three levels to the array. The first level (level 0) is a root level with only two nodes. Every node in the array may include, but is not limited to, the following fields, as indicated in the Legend 300:
  wrd—the word ID, which may be used, for example, in a binary search of the array. The nodes with "&" in the word ID field are pseudo-nodes that mark the ending position of each level.
  P(w|h)—the probability of a transition from a history node to the current node.
  wgt—a weight that may be used to compute the probability of unrecorded children (children not listed in the next level of the current node). The weight, for example, may be used in computing the probability of missed children.
  hist—history node, i.e. a node where current node becomes a history for further computing. Hist may be a 2-tuple (level, index in the level).
  child—The starting index in the next level for history node "children". "Children" are those words that may appear right after the current word. This field may not be needed in the last level.

The child field marks the index of the starting position of the current node's children in the next level. The following illustrates a method for computing how many children a node has according to one embodiment. An exemplary current node is the ith node in level 1, i.e. node (1, i). Node (1, i)'s upper sibling node then is (1, i+1). If node (1, i)'s first child is node (2, m), and node (1, i+1)'s first child is node (2, n), then the number of children node (1, i) has is (n-m). In the exemplary graph, node (1, i) has two children, node (2, b) and node (2, c), and its child boundary may be determined from the child fields of nodes (1, i) and (1, i+1).

The Statistical Language Model 114 may be used to provide the probability from state s to state t on a word w.

In one embodiment of the Statistical Language Model 114 data structure, there are no children at the last level. When transferring to the last level state t, the state may be transferred to a corresponding state t' which has child nodes. For example, in FIG. 5, the state at the last level node (2, b) indicates the state for a word string of two characters, since this embodiment uses a bigram model where one history word is treated as the effective history, so its history state is transferred to the level one state of node (1, x) which has children in level 2 (not shown in the exemplary graph).

Note that, due to the training text and the possible pruning of words as previously described, other levels that the last level may include nodes without children. In other words, some internal (non-leaf) nodes may also have no child nodes. For these nodes, their history nodes are also not themselves, but nodes in a lower level, for example a node in the current level −1, or in the current level −2.

In one embodiment, "wgt" may be a Back-Off Weight according to a Back-Off Language model, such as the Katz Back-Off Language model described in *Estimation of Probabilities from Sparse Data for the Language Model Component of a Speech Recognizer*, IEEE Transactions on Acoustics, Speech and Signal Processing, volume ASSP-35, pages 400-401, March 1987.

The exemplary portion of the Statistical Language Model 114 array in FIG. 5 shows the following probability results for exemplary Chinese words:

| | |
|---|---|
| p(我) = | 0.5 |
| p(我们) = | 0.2 |
| p(是) = | 0.08 |
| p(是 \| 我) = | 0.3 |
| p(将 \| 我) = | 0.16 |

Figure 6:
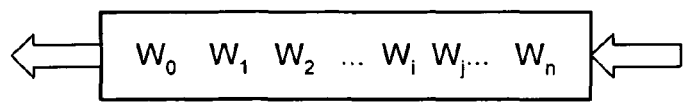
FIG. 6 illustrates an exemplary model for a History Cache according to one embodiment.

FIG. 6 illustrates an exemplary model for a History Cache according to one embodiment. In this model, newly committed words are added at the end of the History Cache, which may, but does not necessarily, result in the oldest committed words in the History Cache being "pushed out" if there is not enough space. In one embodiment, there may be a maximum size for the memory window of the History Cache that specifies how many words may be cached. The actual number of words in the memory window of the History Cache at any one time may be referred to as the size of the memory window.

In one embodiment, two probability mappings of the contents of the History Cache may be generated. A first mapping may map individual words to their frequency of occurrence in the memory window:

$sz$=size of the memory window $P(W)$=frequency($W_i$)/$sz$

A second mapping may map two consecutive words to their frequency of occurrence as a "pair" in the memory window:

$P(W_j|W_i)$=frequency($W_i,W_j$)/$sz$

In one embodiment, a decaying frequency may be used. In this embodiment, when a new word is added to the memory window, every existing frequency is multiplied by a decay constant in the range (0, 1).

Figure 7:
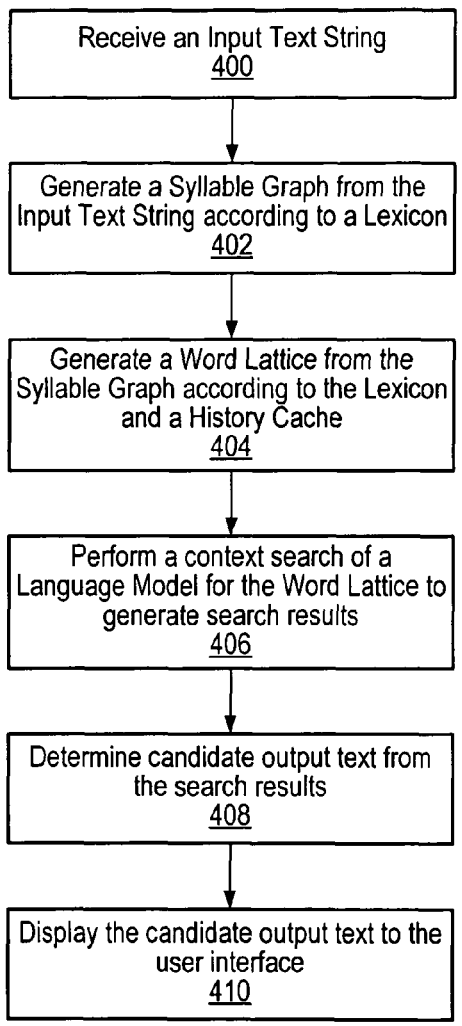
FIG. 7 is a flowchart that illustrates the overall process of generating candidate output text from an input text string according to one embodiment.

FIG. 7 is a flowchart that illustrates the overall process of generating candidate output text from an input text string according to one embodiment. As indicated at 400, the language input mechanism may receive an input text string entered by a user. As indicated at 402, the language input mechanism may then segment the input text string into syllables and generate a Syllable Graph from the input text string according to a Lexicon, as previously described. As indicated at 404, the language input mechanism may then generate a Word Lattice from the Syllable Graph according to the Lexicon and a History Cache, as previously described. As indicated at 406, the language input mechanism may perform a context search of a Language Model for the Word Lattice to generate search results, as previously described. As indicated at 408, the language input mechanism may then determine candidate output text from the generated search results, and then display the candidate output text (which may include a "best" candidate output sentence and one or more candidate output words) to the user interface, as indicated at 410.

Figure 8:
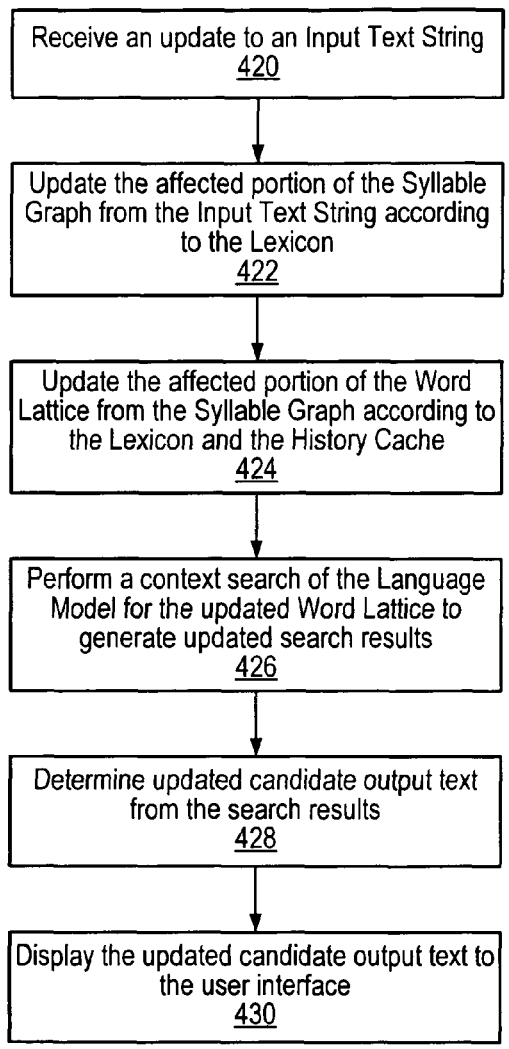
FIG. 8 is a flowchart that illustrates the overall process of updating a candidate output text in response to an update to the input text string according to one embodiment.

FIG. 8 is a flowchart that illustrates the overall process of updating a candidate output text in response to an update to the input text string according to one embodiment. As indicated at 420, the language input mechanism may receive an update, such as an insertion, deletion, or modification, to a previously entered input text string. As indicated at 422, in response to the update to the input text string, the language input mechanism may update the effected portion of the Syllable Graph from the Input Text String according to the Lexicon, as previously described. As indicated at 424, the language input mechanism may update the effected portion of the Word Lattice from the Syllable Graph according to the Lexicon and the History Cache, as previously described. As indicated at 426, the language input mechanism may perform a context search of the Language Model for the updated Word Lattice to generate updated search results, as previously described. As indicated at 428, the language input mechanism may then determine an updated candidate output text from the updated search results, and then display the updated candidate output text (which may include a new "best" candidate output sentence and one or more new candidate output words) to the user interface, as indicated at 430.

Exemplary Language Input Mechanism User Interface

This section describes an exemplary user interface for embodiments of the language input mechanism. A general discussion of the functionality and user experience provided by the user interface are described, and a set of Figures (FIG. 9a through FIG. 10) illustrating an exemplary input session using the exemplary language input mechanism user interface and demonstrating the functionality and user experience of the user interface are described.

As characters are appended to the input text by the user, or as the existing input text is modified (e.g., by inserting additional alphabetic characters, spaces, or other allowed characters, deleting characters, changing characters, etc.), the candidate output words and/or the candidate output sentence may be automatically updated to reflect the changes.

In one embodiment, as characters are appended to the input text by the user, the language input mechanism may automatically insert spaces (or, alternatively, some other character such as a [-]) into the input text to delimit syllables in the phonetic language text. In one embodiment, the user may be able to input a character, for example a ['], that represents a user-specified syllable break. As an example, the user may enter the Pinyin input text xianshimingandao; the language input mechanism may automatically segment the input text into the syllables xian shi min gan dao. Or, alternatively, the user may input a character to indicate a syllable break, as in xi'anshimingandao, which may then be displayed by the language input mechanism, with syllable breaks inserted, as xi'an shi min gan dao.

The user may select either one of the one or more candidate output words or the candidate output sentence as the most accurate or preferred transliteration of a portion or all of the input text beginning at the current selection position. In one embodiment, the portion of the input text for which a candidate output word or output sentence has been selected by the user may be replaced on the display with the selected output word or output sentence. The current selection position may be the first position in the phonetic language input text for which the most accurate or preferred output text has not been selected by the user. Initially, the current selection position is at the first input character in the input text. As the input text is entered by the user, and as the user selects candidate output words or sentences for entered portions of the input text, the current selection position may be automatically advanced to the first character of the portion of the input text for which output words or sentences have not been selected.

After the user has completed entry of the input text and selection of candidate output sentence(s) and/or output word(s) as the most accurate or preferred transliteration of the input text, the user-selected output text may then be manually or automatically added or inserted into a window, document, drawing, or other destination for the written language text output. In one embodiment, the language input mechanism may provide a user interface element that the user may select to specify that the entry of input text and selection of output text has been completed, and thus the output text is ready to be committed. In one embodiment, a terminator character, such as a period, may be entered by the user to specify that the input text has been completed. Other embodiments may use other mechanisms to determine when input text has been completed and/or when output text is to be committed. Typically, but not necessarily, the committed output text will represent a sentence in the written language text. The operation of selecting a completed output text as a most accurate, or preferred, translation of the phonetic language input text and moving the output text to a destination may be referred to herein as "committing" the output text. After a completed output text is committed to a destination, the user may use the language input mechanism to begin entry of a new input text and the associated process of generation of output text.

In one embodiment, rather than having a user select from among candidate output text sentences and words to build the output text (sentence), the language input mechanism may be configured to automatically select the output text (sentence) that is determined by the language input mechanism as the most accurate output text (sentence) for the given input text. In one embodiment, the user may enter a terminator to specify when a sentence of input text has been completed. The output text sentence automatically generated by the language input mechanism may then be automatically committed to the destination. In one embodiment, the user may be able to specify whether automatic commitment of the most accurate output text sentence generated by the language input mechanism or manual selection from among the candidate output words and sentences to build a user-preferred output sentence is to be used in a session.

Figure 9A:
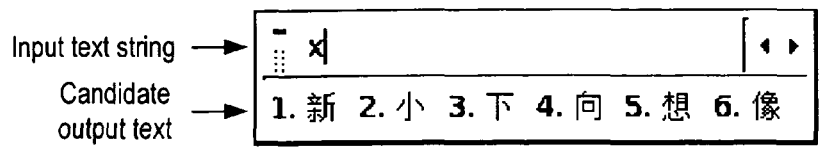
FIGS. 9*a* through 9*u* illustrate the user entry and processing of an exemplary Pinyin input text string to generate an output text sentence according to one embodiment of a language input mechanism user interface.
Figure 9B:
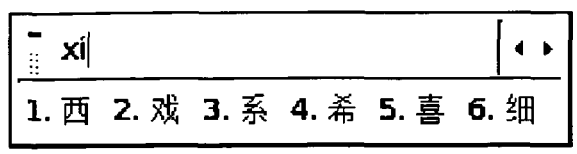
Figure 9C:
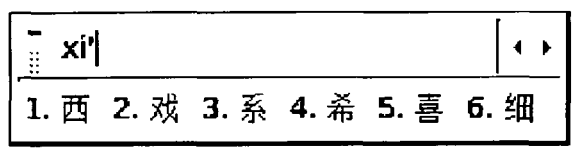
Figure 9D:
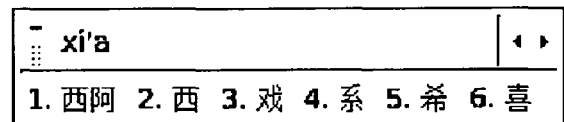
Figure 9E:
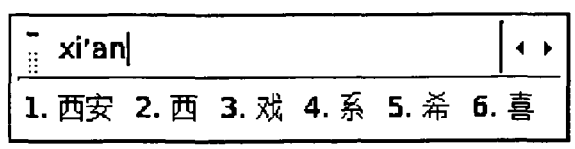
Figure 9F:
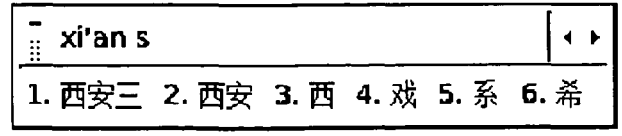
Figure 9G:
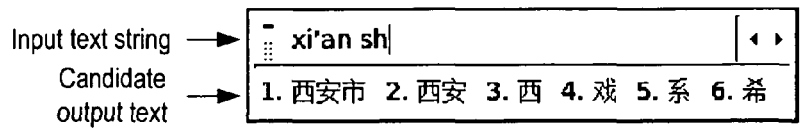
Figure 9H:
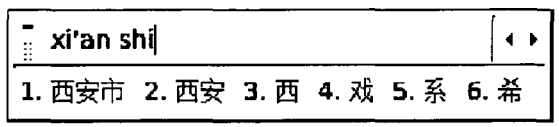
Figure 9I:
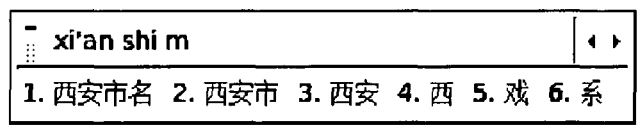
Figure 9J:
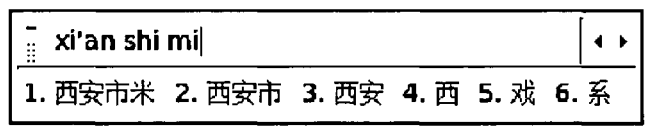
Figure 9K:
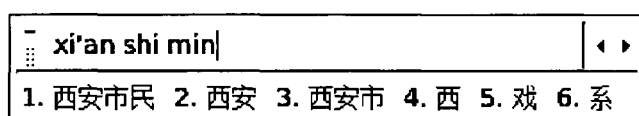
Figure 9L:
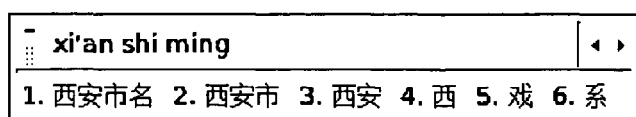
Figure 9S:
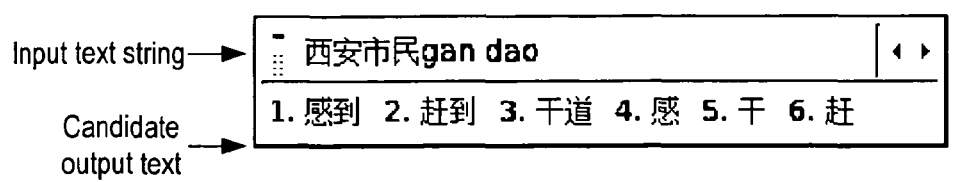
Figure 9T:
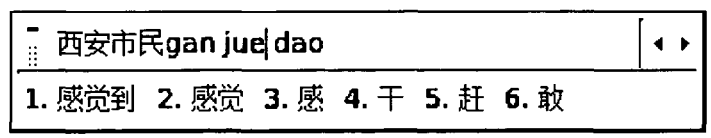
Figure 9U:
Figure 10:
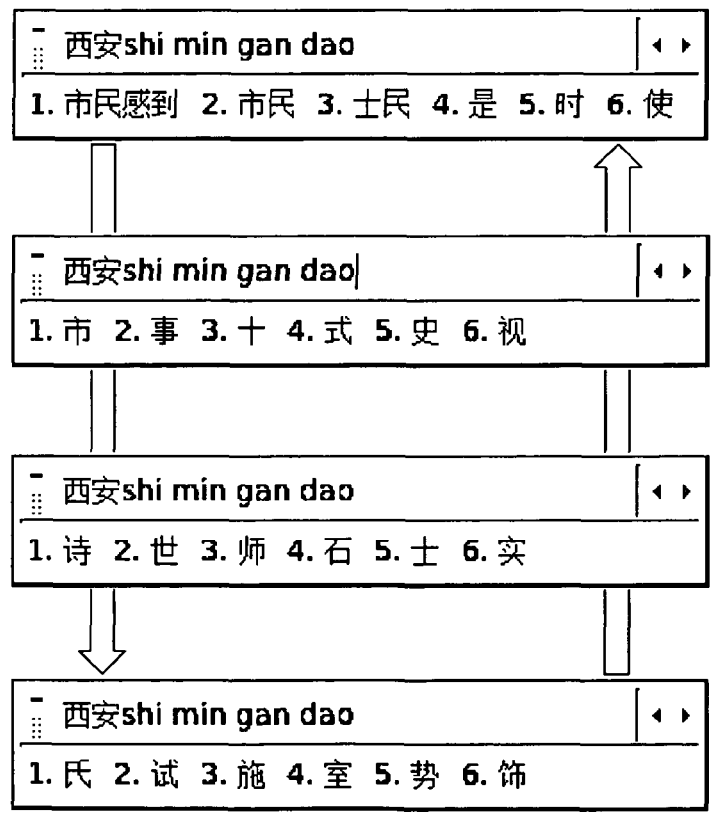
FIG. 10 illustrates paging through a list of candidate output words according to one embodiment.

FIGS. 9a through 9u illustrate the user entry and processing of the exemplary Pinyin input text string xi'anshimin-ganjuedao to generate an output text sentence according to one embodiment of the language input mechanism user interface. FIGS. 9a through 9q illustrate the direct user input of the Pinyin string xi'anshimingandao, with each Figure illustrating the input of one Pinyin character. In each of FIGS. 9a through 9u, the displayed candidate output text may be updated to reflect modifications to the input text string (beginning from the current selection position, which, in FIGS. 9a through 9q, is at the first character [x] in the input text string). Note that, in FIGS. 9a through 9q, the candidate output sentence beginning from the current selection position [x] is displayed in the first position of the output text (position 1); the other candidates are candidate output words at the current selection position, with the "best" or most probable candidate output word as determined by the language input mechanism in position 2, the second best candidate output word in position 3, and so on. Additional (lower probability) candidate output words that are not displayed may be accessible through the user interface, as illustrated in FIG. 10. In FIG. 9c, the user enters ['] as a user-specified syllable break or boundary. In FIG. 9f, after the user enters [s], the language input mechanism automatically inserts a space as a syllable break between xi'an and the next syllable that begins with the letter [s]. In FIGS. 9i, 9m, and 9o, the language input mechanism also automatically inserts a space as a syllable break.

In FIG. 9r, the user may select the candidate output word in position 2 of FIG. 9q (the "best" candidate output word for the Pinyin syllables xi'an as determined by the language output mechanism, in this case). For example, the user may enter a "2" on the keyboard to specify that the candidate output word at position 2 is to be selected. Other user interface mechanisms may be provided in embodiments through which the user may select a candidate output word or candidate output sentence. The syllable(s) in the input text string that represent the candidate output word (xi'an, in this case) may then be replaced by the candidate output word in the input text, as illustrated in FIG. 9r. Note that the current selection position is then automatically advanced to the beginning of the next syllable [shi].

In FIG. 9s, the user may select the candidate output word in position 2 of FIG. 9r (the "best" candidate output word for the Pinyin syllables shi min as determined by the language output mechanism, in this case). The syllable(s) in the input text string that represent the candidate output word (shi min, in this case) may then be replaced by the candidate output word in the input text, as illustrated in FIG. 9s. Note that the current selection position is then automatically advanced to the beginning of the next syllable [gan].

In FIG. 9t, the user has moved the insertion point to between the syllables gan and dao, and the user has inserted the syllable jue into the Pinyin input text string. The candidate output text has been automatically updated to reflect the modification accordingly.

In FIG. 9u, the candidate output text selected by the user has been committed to a destination, in this example to a prompt line in a window on a display, for example the prompt line of an operating system, utility, or application. In this example, the user-selected portion of the output text that has replaced syllables in the input text string, as illustrated in FIG. 9t, along with the candidate output sentence beginning at the current selection position (the beginning of the Pinyin syllable gan) in FIG. 9t (the candidate output sentence is in position 1 of the candidate output text in FIG. 9t) are committed to the destination. In one embodiment, the user may first select the candidate output sentence to replace the input text beginning at the current selection position and then commit the completed output sentence to the destination. In another embodiment, the user may commit directly from the display in FIG. 9t, and the current candidate output sentence (in position 1) may be automatically appended to the previously selected output text and committed to the destination. Note that the language input mechanism user interface may provide one or more user interface elements, such as buttons, menu items, keyboard keys such as function keys, key combinations, mouse actions such as right clicks, etc., through which the user may commit the output text to the destination. Other user interface elements may be provided through which the user may control the language input mechanism in performing other functions.

Note that FIG. 9u illustrates an exemplary destination for the committed output text; embodiments of the language input mechanism as described herein may be used to "commit" Chinese transliterations of Pinyin (or other phonetic language texts) to other types of destinations, such as to documents of a word processor, to email messages, to drawings in a graphic program, to spreadsheets, or in general to any destination that may have a need for the entry of Chinese transliterations of Pinyin.

FIG. 10 illustrates paging through other candidate output words beginning at the user interface previously illustrated in FIG. 9t according to one embodiment. The user interface item may provide one or more user interface elements (for example, the "Page Up" and "Page Down" keys on the keyboard, or alternatively other keys, key combinations, menu items, buttons, mouse actions such as the scroll button, etc) through which the user may scroll down and up through all of the possible candidate output words for the Pinyin input text beginning at the current selection position. The user may select any of the candidate output words, for example by entering the number next to the candidate output word when displayed. The input text string may then be updated by replacing the syllable(s) that represent the selected output word with the selected output word, and the current selection position advanced to the beginning of the next syllable of the Pinyin input text, if any.

Exemplary System

In one embodiment, a system that implements one or more components of a language input mechanism as described herein may include a general-purpose computer system that includes or is configured to access one or more computer-accessible media, such as computer system 900 illustrated in FIG. 11. In the illustrated embodiment, computer system 900 includes one or more processors 910 coupled to a system memory 920 via an input/output (I/O) interface 930. Computer system 900 further includes a network interface 940 coupled to I/O interface 930. Computer system 900 may further include one or more display devices 950, such as CRT or LCD monitors, and one or more input devices, such as a keyboard (e.g., a "QUERTY" keyboard), a mouse, a track ball, a touch screen on a monitor, a microphone, a touch pad or stylus pad, or other input device for accepting user input to system 900, coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as Statistical random access memory (SRAM), synchronous dynamic RAM (SDRAM), nonvolatile/Flash-type memory, or any other type of memory. In the illustrated embodiment, program instructions and data implementing desired functions, such as those methods and techniques described above for an e-commerce Web site of an electronic commerce enterprise that implements a subscription-based shipping program, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In particular, network interface 940 may be configured to allow communication between computer system 900 and other computer systems hosting Web services and Web service clients on the Internet. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 10 for implementing embodiments of a language input mechanism, for example a language input mechanism for converting Hanyu Pinyin input into written Chinese language output. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a processor;
   a memory configured to couple to the processor;
   a display device configured to couple to the processor and the memory;
   an input device configured to couple to the processor, the memory, and the display device;
   wherein the memory comprises program instructions executable by the processor to implement a language input mechanism for converting a phonetic language text to a written language text, wherein the language input mechanism is configured to:
      receive multiple inputs to the input device each specifying a character to be added to a phonetic language input text string displayed in an input text user interface element on the display device, wherein a current selection position is set at the beginning of the phonetic language input text string, and wherein the displayed phonetic language input text string is updated to display an additional phonetic language character in response to each input specifying a character to be added to the phonetic language input text string;
      in response to each input specifying a character to be added to the phonetic language input text string:
         generate a plurality of possible phonetic language syllable segmentations for current content of the phonetic language input text string beginning at the current selection position;
         generate a plurality of possible written language sentences each including two or more written language words from the syllable segmentations;
         determine probability scores for the written language words according to a Language Model comprising written language words and a History Cache of previously selected written language words;
         generate a list of candidate written language words for the current content of the phonetic language input text string beginning at the current selection position from the plurality of possible written language sentences, wherein the list of candidate written language words is sorted according to the probability scores;
         determine one of the plurality of possible written language sentences as a most probable candidate written language sentence for the phonetic language input text string according to the probability scores; and
         write the candidate written language sentence and the list of sorted candidate written language words corresponding to the displayed phonetic language input text string to a user interface of the language input mechanism on the display device, wherein the candidate written language sentence and the list of sorted candidate written language words are displayed in a candidate output text user interface element that is displayed separately on the display device from the input text user interface element that displays the current phonetic language input text string;
      wherein the language input mechanism simultaneously and dynamically displays on the display device the current phonetic language input text string in the input text user interface element and the corresponding candidate written language sentence and the list of sorted candidate written language words in the candidate output text user interface element; and
      wherein the language input mechanism is further configured to replace portions of the currently displayed phonetic language input text string in the input text user interface element beginning at the current selection position with written language symbols from the candidate output text user interface element in response to input selecting either the candidate written language sentence or one of the written language words in the current list of sorted candidate written language words from the candidate output text user interface element.

2. The system as recited in claim 1, wherein each of the plurality of possible written language sentence corresponds to one of the syllable segmentations, wherein each written language word in each of the plurality of possible written language sentences corresponds to one or more of the syllables in the corresponding syllable segmentation, and wherein each syllable segmentation corresponds to one or more of the plurality of possible written language sentences.

3. The system as recited in claim 1, wherein the language input mechanism is further configured to:
   in response to input indicating that a completed written language output sentence is to be committed to a destination on the display device:
      build a completed written language output sentence from the selected written language symbols displayed in the input text user interface element and the candidate written language sentence displayed in the candidate output text user interface element; and
      commit the completed written language sentence to a destination on the display device.

4. The system as recited in claim 1, wherein the language input mechanism is further configured to prune one or more written language words with low frequency in the Language Model from the plurality of possible written language sentences, wherein written language words that are in the History Cache are not pruned from the written language sentences.

5. The system as recited in claim 1, wherein, to determine probability scores for the written language words, the language input mechanism is further configured to determine low probability scores for written language words with relatively rare alternative pronunciations corresponding to one or more syllables in the phonetic language input text string.

6. The system as recited in claim 1, wherein the phonetic language text is Pinyin, and wherein the written language text is Chinese.

7. A system, comprising:
a processor;
a memory comprising program instructions, wherein the program instructions are executable by the processor to implement a language input mechanism for converting a phonetic language text to a written language text, wherein the language input mechanism is configured to:
generate a plurality of possible phonetic language syllable segmentations for a phonetic language input text string;
generate a plurality of possible written language sentences each including one or more written language words, wherein each sentence corresponds to one of the syllable segmentations, and wherein each word in each sentence corresponds to one or more of the syllables in the corresponding syllable segmentation;
determine probability scores for the written language words and for sequences of two or more written language words in the plurality of possible written language sentences according to a language model comprising written language words and a history cache of previously selected written language words;
generate a list of candidate output written language words for a current selection position in the phonetic language input text string from the plurality of possible written language sentences, wherein the list of candidate output written language words is sorted according to the probability scores;
determine one of the possible written language sentences as a most probable candidate output written language sentence for the phonetic language input text string according to the probability scores; and
output at least part of the list of sorted candidate output written language words and the candidate output written language sentence in a candidate output text user interface element.

8. The system as recited in claim 7, wherein each syllable segmentation corresponds to one or more of the sentences.

9. The system as recited in claim 7, wherein the system further comprises a display device configured to couple to the processor and the memory, and wherein the language input mechanism is further configured to write the candidate output written language sentence and the list of sorted candidate output written language words to a user interface of the language input mechanism on the display device.

10. The system as recited in claim 9, wherein the system further comprises an input device configured to couple to the processor and the memory, and wherein the language input mechanism is further configured to:
build a completed written language output sentence in response to user input to the user interface selecting from the displayed candidate output sentence and the list of sorted candidate output words; and
commit the completed output sentence to a destination on the display device in response to user input to the user interface.

11. The system as recited in claim 10, wherein the language input mechanism is further configured to write the completed output sentence to the history cache.

12. The system as recited in claim 9, wherein the system further comprises an input device configured to couple to the processor and the memory, and wherein the language input mechanism is further configured to:
receive modifications to the phonetic language input text string as user input to the user interface;
modify the plurality of possible phonetic language syllable segmentations according to the modifications to the input text string;
modify the plurality of possible written language sentences according to the modifications to the syllable segmentations;
determine probability scores for individual words and for sequences of two or more words in the modified sentences;
generate a new list of candidate output words for a current selection position in the modified input text string from the modified sentences; and
determine one of the modified sentences as a most probable candidate output sentence for the modified input text string.

13. The system as recited in claim 12, wherein the language input mechanism is further configured to update the user interface with the candidate output sentence for the modified input text string and the new list of sorted candidate output words.

14. The system as recited in claim 7, wherein the system further comprises an input device configured to couple to the processor and the memory, and wherein the language input mechanism is further configured to receive the phonetic language input text string as user input to the input device.

15. The system as recited in claim 14, wherein the language input mechanism is further configured to:
accept one or more user-specified syllable segmentations in the phonetic language input text string; and
generate one or more of the possible phonetic language syllable segmentations for the phonetic language input text string in accordance with the user-specified syllable segmentations.

16. The system as recited in claim 14, wherein the language input mechanism is further configured to:
accept one or more user-specified partial syllables in the phonetic language input text string; and
generate one or more of the possible phonetic language syllable segmentations for the phonetic language input text string in accordance with the user-specified partial syllables.

17. The system as recited in claim 7, wherein the language model is trained from a set of texts written in the written language text.

18. The system as recited in claim 7, wherein the language input mechanism is further configured to prune one or more words with low frequency in the language model from the plurality of possible written language sentences.

19. The system as recited in claim 8, wherein words that are in the history cache are not pruned from the sentences.

20. The system as recited in claim 7, wherein, to generate a plurality of possible phonetic language syllable segmentations for a phonetic language input text string, the language input mechanism is further configured to generate the possible phonetic language syllable segmentations according to a lexicon of possible phonetic language syllables.

21. The system as recited in claim 7, wherein, to generate a plurality of possible phonetic language syllable segmentations for a phonetic language input text string, the language input mechanism is further configured to include possible syllables determined from partial syllables in the input text string in one or more of the possible phonetic language syllable segmentations.

22. The system as recited in claim 7, wherein syllable segmentation of the phonetic language input text string is ambiguous, and wherein the language input mechanism is further configured to include two or more alternative syllable segmentations for the input text string in the plurality of possible phonetic language syllable segmentations.

23. The system as recited in claim 7, wherein, to generate a plurality of possible phonetic language syllable segmentations for a phonetic language input text string, the language input mechanism is further configured to include possible syllables determined in accordance with one or more syllable segmentation indications included in the input text string in one or more of the possible phonetic language syllable segmentations.

24. The system as recited in claim 7, wherein, to generate a plurality of possible written language sentences, the language input mechanism is further configured to generate the possible written language sentences according to a lexicon that maps possible phonetic language syllables and partial syllables to written language words, wherein each possible syllable and partial syllable maps to one or more of the written language words.

25. The system as recited in claim 7, wherein, to determine probability scores for the individual words, the language input mechanism is further configured to determine low probability scores for words with relatively rare alternative pronunciations corresponding to one or more syllables in the phonetic language input text string.

26. The system as recited in claim 7, wherein one or more syllables in the phonetic language represent a pronunciation corresponding to one or more written language words, and wherein one or more of the written language words in the language model each correspond to two or more alternative pronunciations each represented by one or more syllables in the phonetic language.

27. The system as recited in claim 26, wherein, for each word in the language model with alternative pronunciations, each word/pronunciation alternative is assigned one of two or more pronunciation types.

28. The system as recited in claim 27, wherein a single most common word/pronunciation alternative is assigned a major pronunciation type, wherein one or more relatively rare word/pronunciation alternatives are assigned an ignored pronunciation type, and wherein other word/pronunciation alternatives are assigned a normal pronunciation type.

29. The system as recited in claim 27, wherein, to determine probability scores for the individual words, the language input mechanism is further configured to:
  determine the pronunciation type assigned to each word/pronunciation alternative corresponding to one or more syllables in the phonetic language input text string, wherein a single most common pronunciation of a word is assigned a major pronunciation type, and wherein one or more relatively rare pronunciations of a word are assigned an ignored pronunciation type;
  if the word/pronunciation alternative is assigned a major pronunciation type, generate a relatively high probability score for the word/pronunciation alternative; and
  if the word/pronunciation alternative is assigned an ignored pronunciation type, generate a relatively low probability score for the word/pronunciation alternative.

30. The system as recited in claim 7, wherein the phonetic language text is Pinyin, and wherein the written language text is Chinese.

31. The system as recited in claim 7, wherein the phonetic language text is Hanyu Pinyin, and wherein the written language text is Mandarin Chinese.

32. A computer-implemented method for converting a phonetic language text to a written language text, the method comprising:
  performing, by one or more computers:
    generating a plurality of possible phonetic language syllable segmentations for a phonetic language input text string;
    generating a plurality of possible written language sentences each including one or more written language words, wherein each sentence corresponds to one of the syllable segmentations, and wherein each word in each sentence corresponds to one or more of the syllables in the corresponding syllable segmentation;
    determining probability scores for the words and for sequences of two or more words in the sentences according to a language model comprising written language words and a history cache of previously selected written language words;
    generating a list of candidate output words for a current selection position in the phonetic language input text string from the sentences, wherein the list of candidate output words is sorted according to the probability scores;
    determining one of the possible written language sentences as a most probable candidate output sentence for the phonetic language input text string according to the probability scores; and
    generating a user interface element including at least part of the list of sorted candidate output words and the candidate output sentence.

33. The method as recited in claim 32, further comprising writing the candidate output written language sentence and the list of sorted candidate output written language words to the user interface on a display device.

34. The method as recited in claim 33, further comprising:
  building a completed written language output sentence in response to user input to the user interface selecting from the displayed candidate output sentence and the list of sorted candidate output words; and
  committing the completed output sentence to a destination on the display device in response to user input to the user interface.

35. The method as recited in claim 32, further comprising receiving the phonetic language input text string as user input to a user interface on a display device.

36. The method as recited in claim 32, further comprising pruning one or more words with low frequency in the language model from the plurality of possible written language sentences.

37. The method as recited in claim 32, wherein said generating a plurality of possible phonetic language syllable segmentations for a phonetic language input text string comprises including possible syllables determined from partial syllables in the input text string in one or more of the possible phonetic language syllable segmentations.

38. The method as recited in claim 32, wherein said generating a plurality of possible phonetic language syllable segmentations for a phonetic language input text string comprises including possible syllables determined in accordance with one or more syllable segmentation indications included the input text string in one or more of the possible phonetic language syllable segmentations.

39. The method as recited in claim 32, wherein said generating a plurality of possible written language sentences comprises generating the possible written language sentences according to a lexicon that maps possible phonetic language syllables and partial syllables to written language words, wherein each possible syllable and partial syllable maps to one or more of the written language words.

40. The method as recited in claim 32, wherein said determining probability scores for the individual words comprises determining low probability scores for words with relatively rare alternative pronunciations corresponding to one or more syllables in the phonetic language input text string.

41. The method as recited in claim 32, wherein the phonetic language text is Pinyin, and wherein the written language text is Chinese.

42. A non-transitory computer-readable storage medium storing program instructions, wherein the program instructions are computer-executable to implement a language input mechanism for converting a phonetic language text to a written language text, wherein the language input mechanism is configured to:
   generate a plurality of possible phonetic language syllable segmentations for a phonetic language input text string;
   generate a plurality of possible written language sentences each including one or more written language words, wherein each sentence corresponds to one of the syllable segmentations, and wherein each word in each sentence corresponds to one or more of the syllables in the corresponding syllable segmentation;
   determine probability scores for the words and for sequences of two or more words in the sentences according to a language model comprising written language words and a history cache of previously selected written language words;
   generate a list of candidate output words for a current selection position in the phonetic language input text string from the sentences, wherein the list of candidate output words is sorted according to the probability scores;
   determine one of the possible written language sentences as a most probable candidate output sentence for the phonetic language input text string according to the probability scores; and
   output at least a portion of the list of sorted candidate output words and the candidate output sentence.

43. The non-transitory computer-readable storage medium as recited in claim 42, wherein the language input mechanism is further configured to write the candidate output written language sentence and the list of sorted candidate output written language words to a user interface of the language input mechanism on a display device.

44. The non-transitory computer-readable storage medium as recited in claim 43, wherein the language input mechanism is further configured to:
   build a completed written language output sentence in response to user input to the user interface selecting from the displayed candidate output sentence and the list of sorted candidate output words; and
   commit the completed output sentence to a destination on the display device in response to user input to the user interface.

45. The non-transitory computer-readable storage medium as recited in claim 42, wherein the language input mechanism is further configured to receive the phonetic language input text string as user input to a user interface on a display device.

46. The non-transitory computer-readable storage medium as recited in claim 42, wherein the language input mechanism is further configured to prune one or more words with low frequency in the language model from the plurality of possible written language sentences.

47. The non-transitory computer-readable storage medium as recited in claim 42, wherein, to generate a plurality of possible phonetic language syllable segmentations for a phonetic language input text string, the language input mechanism is further configured to include possible syllables determined from partial syllables in the input text string in one or more of the possible phonetic language syllable segmentations.

48. The non-transitory computer-readable storage medium as recited in claim 42, wherein, to generate a plurality of possible phonetic language syllable segmentations for a phonetic language input text string, the language input mechanism is further configured to include possible syllables determined in accordance with one or more syllable segmentation indications included the input text string in one or more of the possible phonetic language syllable segmentations.

49. The non-transitory computer-readable storage medium as recited in claim 42, wherein, to generate a plurality of possible written language sentences, the language input mechanism is further configured to generate the possible written language sentences according to a lexicon that maps possible phonetic language syllables and partial syllables to written language words, wherein each possible syllable and partial syllable maps to one or more of the written language words.

50. The non-transitory computer-readable storage medium as recited in claim 42, wherein, to determine probability scores for the individual words, the language input mechanism is further configured to determine low probability scores for words with relatively rare alternative pronunciations corresponding to one or more syllables in the phonetic language input text string.

51. The non-transitory computer-readable storage medium as recited in claim 42, wherein the phonetic language text is Pinyin, and wherein the written language text is Chinese.

* * * * *